(12) United States Patent
Weinrotter et al.

(10) Patent No.: US 8,459,222 B2
(45) Date of Patent: Jun. 11, 2013

(54) LASER SPARK PLUG

(71) Applicants: Martin Weinrotter, Vitoria-Gasteiz (ES); Pascal Woerner, Korntal-Münchingen (DE); Juergen Raimann, Weil Der Stadt (DE); Joerg Engelhardt, Ditzingen (DE)

(72) Inventors: Martin Weinrotter, Vitoria-Gasteiz (ES); Pascal Woerner, Korntal-Münchingen (DE); Juergen Raimann, Weil Der Stadt (DE); Joerg Engelhardt, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/710,915

(22) Filed: Dec. 11, 2012

(65) Prior Publication Data

US 2013/0098323 A1  Apr. 25, 2013

Related U.S. Application Data

(63) Continuation of application No. 12/927,249, filed on Nov. 9, 2010, now Pat. No. 8,375,911.

(30) Foreign Application Priority Data

Nov. 23, 2009  (DE) .......................... 10 2009 047 019

(51) Int. Cl.
*F02P 23/04*  (2006.01)
*F02B 19/12*  (2006.01)

(52) U.S. Cl.
USPC ...................................... 123/143 B; 123/260

(58) Field of Classification Search
USPC ............................... 123/147 B, 260, 262, 263
See application file for complete search history.

(56) References Cited

U.S. PATENT DOCUMENTS

| | | | |
|---|---|---|---|
| 4,930,473 A | 6/1990 | Dietrich | |
| 5,554,908 A | 9/1996 | Kuhnert et al. | |
| 6,601,560 B1 | 8/2003 | Serve | |
| 7,637,239 B2 | 12/2009 | Gagliano et al. | |
| 7,659,655 B2 | 2/2010 | Tozzi et al. | |
| 7,770,552 B2 * | 8/2010 | Schultz ..................... | 123/143 B |
| 7,798,118 B2 | 9/2010 | Gagliano et al. | |
| 7,806,094 B2 * | 10/2010 | Gruber ...................... | 123/143 B |
| 7,856,956 B2 | 12/2010 | Inoue et al. | |
| 7,922,551 B2 | 4/2011 | Tozzi | |
| 8,104,444 B2 * | 1/2012 | Schultz ..................... | 123/143 B |
| 8,181,617 B2 | 5/2012 | Kuhnert et al. | |
| 2006/0144362 A1 * | 7/2006 | Robinet et al. ................ | 123/270 |
| 2007/0099133 A1 | 5/2007 | Hanenkamp et al. | |
| 2009/0159031 A1 * | 6/2009 | Gruber ...................... | 123/143 B |

(Continued)

FOREIGN PATENT DOCUMENTS

| DE | 102006018973 | 10/2007 |
|---|---|---|
| DE | 10 2007 045 180 | 4/2009 |

(Continued)

*Primary Examiner* — Stephen K Cronin
*Assistant Examiner* — Arnold Castro
(74) *Attorney, Agent, or Firm* — Kenyon & Kenyon LLP

(57) ABSTRACT

A laser spark plug device for an internal combustion engine includes a prechamber for receiving an ignitable medium and at least one overflow channel providing a fluid connection between an internal space of the prechamber and an external space surrounding the prechamber. The at least one overflow channel is configured such that when a fluid flows through the overflow channel into the internal space of the prechamber, the result is a fluid flow having at least one eddy which rotates on an eddy axis forming an angle of more than approximately 45° with a longitudinal axis of the laser spark plug device.

6 Claims, 4 Drawing Sheets

U.S. PATENT DOCUMENTS

2010/0147259 A1    6/2010   Kuhnert et al.
2011/0120404 A1    5/2011   Weinrotter et al.
2011/0297121 A1*  12/2011   Kraus et al. .................. 123/260
2012/0060791 A1    3/2012   Woerner et al.
2012/0304959 A1*  12/2012   Weinrotter et al. ........... 123/260

FOREIGN PATENT DOCUMENTS

| | | |
|---|---|---|
| DE | 10 2008 018 482 | 10/2009 |
| FR | 2 873 763 | 2/2006 |
| JP | 58-162773 | 9/1983 |
| WO | WO 2006/011950 | 2/2006 |

* cited by examiner

LASER SPARK PLUG

CROSS-REFERENCE TO RELATED APPLICATIONS

The present application is a continuation application of U.S. patent application Ser. No. 12/927,249 filed on Nov. 9, 2010, and claims priority to German Patent Application No. 10 2009 047 019.0 filed on Nov. 23, 2009, the content of all of which are hereby incorporated by reference in their entireties.

BACKGROUND OF THE INVENTION

1. Field of the Invention

The present invention relates to a laser spark plug for an internal combustion engine, the laser spark plug having a prechamber for receiving an ignitable medium and at least one overflow channel making possible a fluid connection between one internal space of the prechamber and one external space surrounding the prechamber.

BRIEF SUMMARY OF THE INVENTION

An object of the present invention is to provide an improved laser spark plug of the type referred to at the outset for the purpose of ensuring reliable operation and longer life.

This objective is achieved in a laser spark plug of the type referred to at the outset in that the at least one overflow channel is situated and designed in such a way that when a fluid flows through the overflow channel into the internal space of the prechamber, the result is a fluid flow having at least one eddy which rotates on an eddy axis forming an angle of more than approximately 45° to a longitudinal axis of the laser spark plug.

It is particularly preferred that the at least one overflow channel is situated outside of the longitudinal axis.

According to the present invention, it has been recognized that such a fluid flow contributes favorably to preventing stagnation flows in the area of a surface of a combustion chamber window of the laser spark plug. Consequently, oil ashes or other particles arising during combustion in the prechamber accumulate to only a slight degree on the surface of the combustion chamber window, thus ensuring more reliable laser ignition and longer life than is the case in the conventional laser ignition systems having a prechamber.

In an example embodiment of the laser spark plug according to the present invention, the angle between the eddy axis and the longitudinal axis of the laser spark plug is between approximately 80° and approximately 90°, preferably approximately 90°. A fluid flow satisfying an angle condition of this type in relation to the longitudinal axis of the laser spark plug is also denoted as a so-called tumble flow.

The design of a tumble flow achieved according to the present invention makes it possible in a particularly advantageous manner to protect a surface of the combustion chamber window of the laser spark plug against the accumulation of combustion products, since it strongly reduces or eliminates a normal component of the flow velocity directed to the combustion chamber window.

According to another variant of the invention, the design of a tumble flow according to the present invention is favored in that the at least one overflow channel is situated in such a way that its longitudinal axis in the radial direction forms an angle with the longitudinal axis of the laser spark plug which is smaller than approximately 25°, preferably smaller than approximately 10°.

According to another example embodiment, it is particularly preferred that a plurality of overflow channels are provided, the longitudinal axes of adjacent overflow channels forming a maximum angle of 20°, preferably a maximum angle of 10°.

This variant of the present invention is preferred in such overflow channels, the orifices of which are situated in a face-side area of the prechamber facing the combustion chamber.

Another variant of the present invention results in a particularly intensive fluid flow according to the present invention when a plurality of overflow channels are provided which are situated and designed in such a way that the longitudinal axes of at least three overflow channels intersect at a point of intersection lying in the internal space of the prechamber. The addition of the partial flows flowing through the individual overflow channels favors the formation of a particularly strong fluid flow in the sense of a tumble flow.

A tumble flow in the prechamber may be achieved further in a particularly reliable manner in that the point of intersection lies in a radially external area of the prechamber, the point of intersection being at a distance of at least 50% to approximately 70% of a radius of the prechamber from the longitudinal axis of the laser spark plug or the prechamber.

According to another variant of the present invention, distribution of ignition flares emerging from the prechamber that is as uniform as possible as necessary for efficient ignition is ensured, if openings opening into the external space of the overflow channels, whose longitudinal axes intersect in the internal space of the prechamber, are substantially at a uniform distance from one another and/or the longitudinal axis of the laser spark plug, in particular in the area of the corners of a fictional n-corner, n being $\geq 3$.

According to another advantageous variant of the present invention, at least one flow-guiding element may be provided which is designed for supporting the fluid flow and in particular for guiding the flow tangentially past a surface of a combustion chamber window facing the prechamber. To that end, the at least one flow-guiding element may have a flow-guiding surface, the shape of which roughly corresponds to an external contour of a tumble flow or an associated eddy which is seen as ideal.

According to another advantageous variant of the present invention, an optimal design of such a tumble flow is favored in that a combustion chamber window is provided and situated in such a way that its surface facing the prechamber is flush with one internal wall of the prechamber at least sectionally.

According to another variant of the present invention, an optimal implementation of the ignitable mixture located in the prechamber results when the laser spark plug is designed for radiating laser radiation onto an ignition point lying in the prechamber, the distance of which from a combustion chamber window is less than its distance from an end area of the prechamber facing the combustion chamber, in particular by at least approximately 50% less. This advantageously has the result that the flame core arising in the ignition point during laser ignition is carried along by the tumble flow produced according to the present invention and is guided into an end area of the prechamber facing the combustion chamber. The further development of a flame front in this area has the particular advantage that less unburned mixture is discharged from the prechamber into the external space or combustion chamber, resulting in increased efficiency of laser ignition in the prechamber.

DETAILED DESCRIPTION OF THE INVENTION

Figure 1:
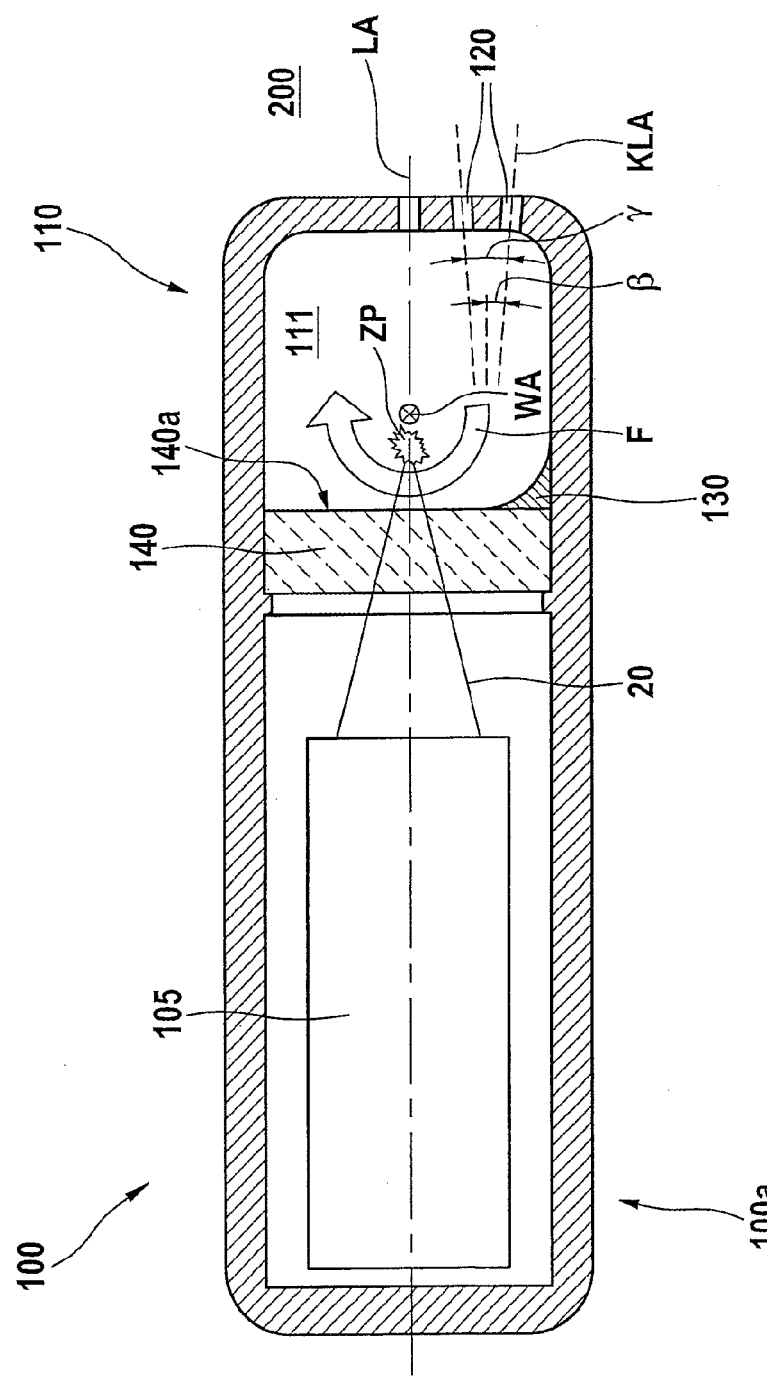
FIG. 1 shows a partial cross-section of a first example embodiment of a laser spark plug according to the present invention.

FIG. 1 shows a partial cross section of a first example embodiment of laser spark plug 100 according to the present invention. Laser spark plug 100 has an integrated laser device 105 which is able to generate laser radiation 20 and bundle it onto ignition point ZP lying in a prechamber 110 of laser spark plug 100.

The internal space of prechamber 110 is separated from part 100a of laser spark plug 100 facing away from the combustion chamber by a combustion chamber window 140.

Furthermore, laser spark plug 100 or its prechamber 110 has overflow channels 120 which make a fluid connection possible between prechamber 110 and an external area 200, which may be, for example, a combustion chamber of the internal combustion engine when laser spark plug 100 is installed in an internal combustion engine.

According to the present invention, at least one overflow channel 120 is situated and designed in such a way that when a fluid flows through overflow channel 120 into internal space 111 of prechamber 110, the result is a fluid flow F having at least one eddy which rotates on an eddy axis WA forming an angle of more than approximately 45° with a longitudinal axis LA of laser spark plug 100.

It is particularly preferred that overflow channel 120 is situated outside of longitudinal axis LA, which further favors the formation of fluid flow F according to the present invention.

In the present case, the fluid flow formed according to the present invention is denoted by block arrow F. A corresponding eddy axis is perpendicular to the plane of projection in FIG. 1. In the present case eddy axis WA accordingly forms a right angle with longitudinal axis LA of laser spark plug 100. In this case, fluid flow F provided according to the present invention is also described as a so-called tumble flow.

Tumble flow F advantageously has only one tangential flow velocity component in relation to surface 140a of combustion chamber window 140, advantageously preventing the deposition of combustion products on surface 140a.

For the further support of tumble flow F, at least one flow-guiding element 130 may also be provided in prechamber 110.

According to another particularly preferred variant of the present invention, at least one overflow channel 120 is situated in such a way that its longitudinal axis KLA in relation to longitudinal axis LA of laser spark plug 100 in the radial direction forms an angle β with longitudinal axis LA of laser spark plug 100 which is smaller than approximately 25°, preferably smaller than approximately 10°.

According to another example embodiment of the present invention, it may also be provided that a plurality of overflow channels 120 are oriented in such a way that the longitudinal axes of adjacent overflow channels form a maximum angle Y of 20°, preferably a maximum angle of 10°. This also applies to an observation in relation to longitudinal axis LA in a radial and also in an axial direction.

Figure 2:
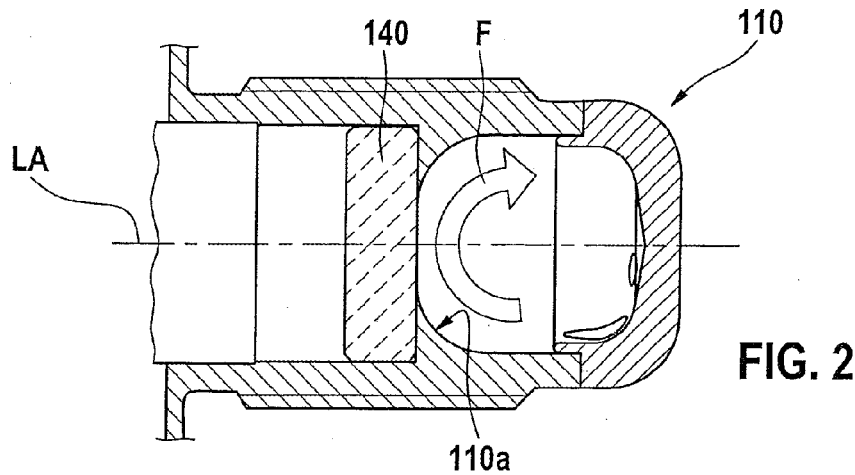
FIG. 2 shows another example embodiment of the laser spark plug according to the present invention having optimized flow guidance in a boundary area between the combustion chamber window and the internal wall of the prechamber.

FIG. 2 shows a partial cross section of another example embodiment of the laser spark plug according to the present invention, prechamber 110 already being formed in such a way that it ensures optimized flow guidance due to appropriately rounded internal wall sections 110a. In this case, no separate flow-guiding element 130, see FIG. 1, is necessary.

Figure 3A:
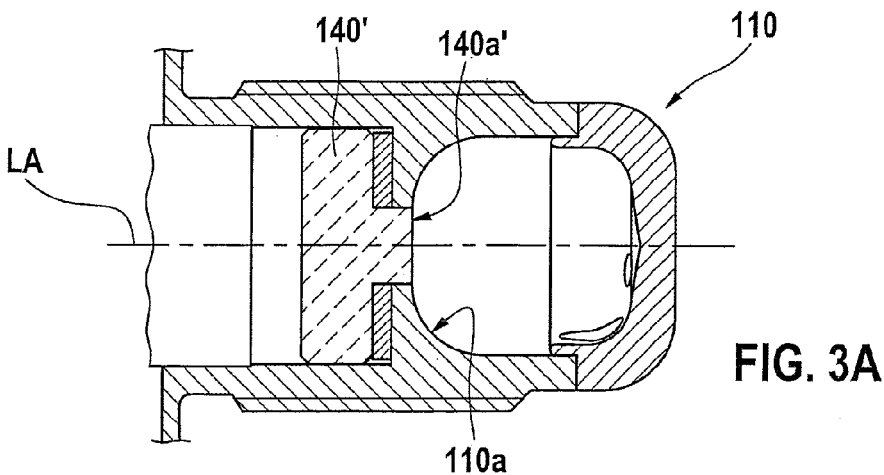
FIGS. 3a and 3b show additional variants of a laser spark plug according to the present invention.

FIG. 3a shows another example embodiment of a prechamber 110 according to the present invention, a combustion chamber window 140' which has a substantially T-shaped cross section being provided. This makes it possible to improve the fit of combustion chamber window 140' in corresponding receiving means, not described in greater detail here, of laser spark plug 100. Furthermore, combustion chamber window 140' may also be situated advantageously in relation to prechamber 110 in such a way that a surface 140a' of combustion chamber window 140' facing prechamber 110 is flush with an internal wall section 110a of prechamber 110.

Figure 3B:
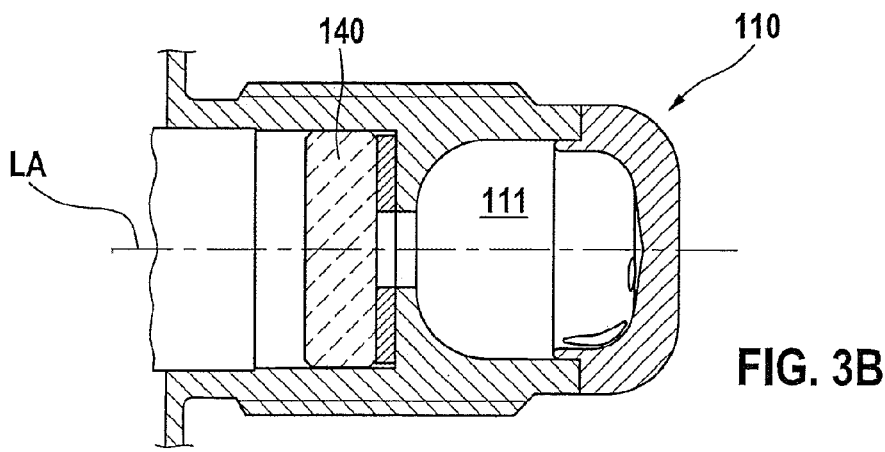

FIG. 3b shows another variant of a prechamber 110 for a laser spark plug according to the present invention, in which combustion chamber window 140 is set back by a discrete distance in relation to internal space 111 of prechamber 110, which also reduces an accumulation of combustion products on combustion chamber window 140.

Figure 4:
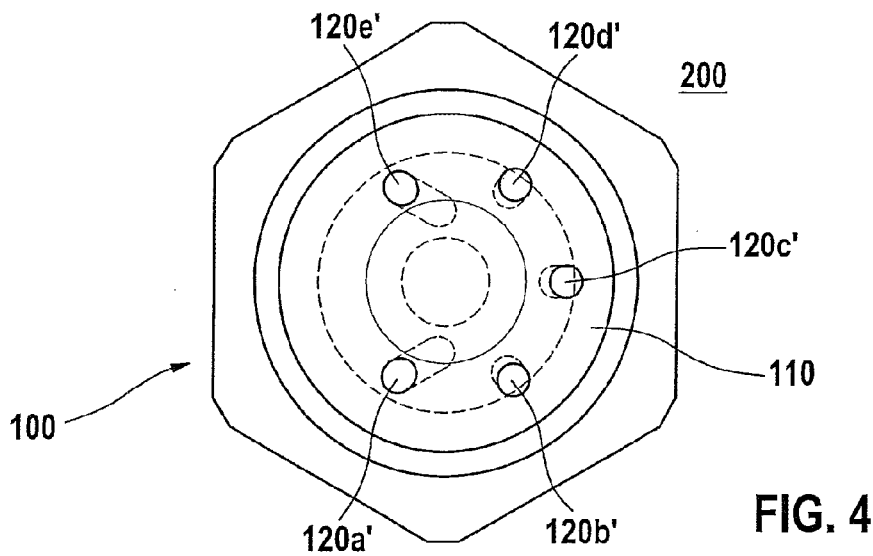
FIG. 4 shows a front view of an end of another example embodiment of the laser spark plug according to the present invention facing the combustion chamber.

FIG. 4 shows a front view of another example embodiment of a laser spark plug according to the present invention, prechamber 110 having a total of five overflow channels, of which only the openings opening into external space 200 surrounding prechamber 110 are denoted as 120a', 120b', 120c', 120d', 120e'.

As shown in FIG. 4, a basically asymmetric positioning of the overflow channels or their respective openings 120a', 120b', 120c', 120d', 120e'—in relation to longitudinal axis LA (FIG. 1)—in the direction of external space 200 is also suitable for making a tumble flow according to the present invention possible.

Figure 5:
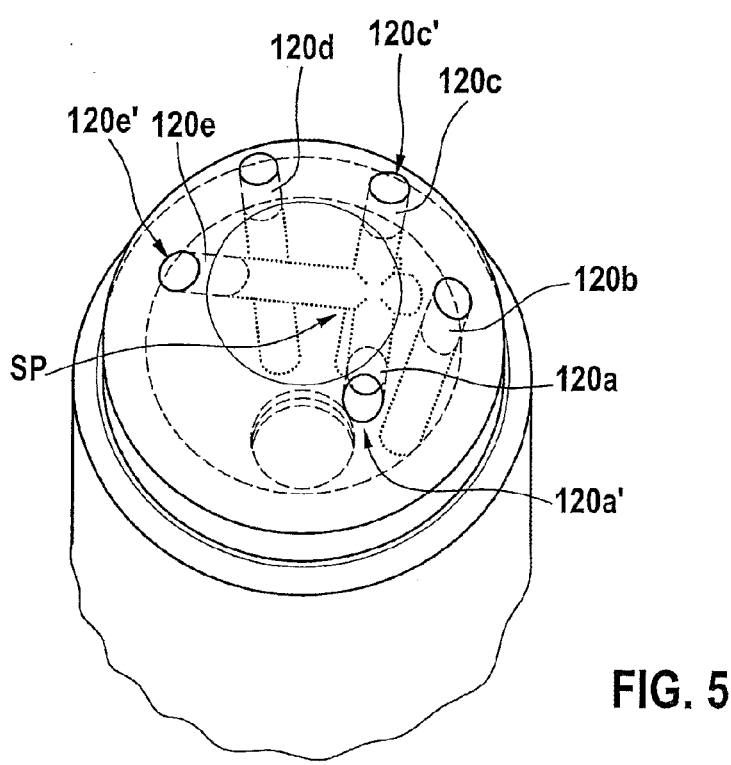
FIG. 5 shows a perspective view of an end area of another example embodiment of the laser spark plug according to the present invention facing the combustion chamber.

FIG. 5 shows a perspective view of the laser spark plug according to the present invention, five overflow channels 120a, 120b, 120c, 120d, 120e also being provided in this case.

In this case, overflow channels 120a, 120b, 120c, 120d, 120e are situated and designed in such a way that the longitudinal axes of at least three overflow channels 120a, 120c, 120e intersect in internal space 111 (FIG. 1) of prechamber 110, and specifically at a point of intersection SP, as a result of which the individual partial flows are advantageously added to one another to form a tumble flow F (FIG. 1).

A particularly efficient formation of a fluid flow F into the internal space of prechamber 110 according to the present invention is ensured if point of intersection SP lies in a radially external area of prechamber 110, point of intersection SP in particular being at a distance of approximately 50. % to approximately 70% of the radius of prechamber 110 from longitudinal axis LA of laser spark plug 100.

According to another advantageous variant of the present invention, substantially uniform action on the external space or combustion chamber 200 by ignition flares emerging from prechamber 110 is ensured, in that openings 120a', 120c', 120e' (FIG. 5) opening into external space 200 of the overflow channels 120a, 120c, 120e, whose longitudinal axes intersect in internal space 111 of prechamber 110, are substantially at a uniform distance from one another and/or from longitudinal axis LA of laser spark plug 100, in particular in the area of the corners of a fictional n-corner, n being $\geq 3$.

If fluid flows out of external space 200 into internal space 111 of prechamber 110, this configuration simultaneously favors an advantageous addition of the partial flows of the three intersecting overflow channels in such a way that an intensified fluid flow F according to the present invention is present at the outlet end in the area of intersection of the overflow channels.

FIGS. 6a to 6d show various operating phases of a laser spark plug 100 according to the present invention.

Figure 6B:
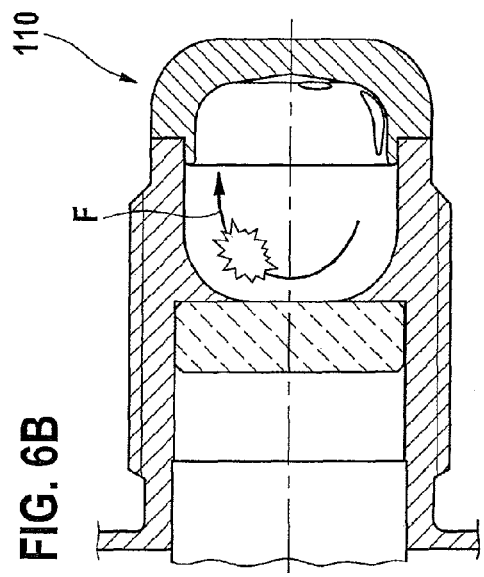
FIGS. 6a through 6d show various operating phases of the laser spark plug according to the present invention.
Figure 6D:
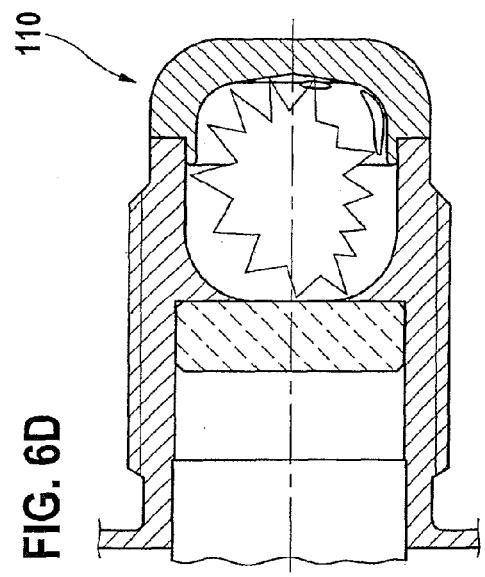
Figure 6A:
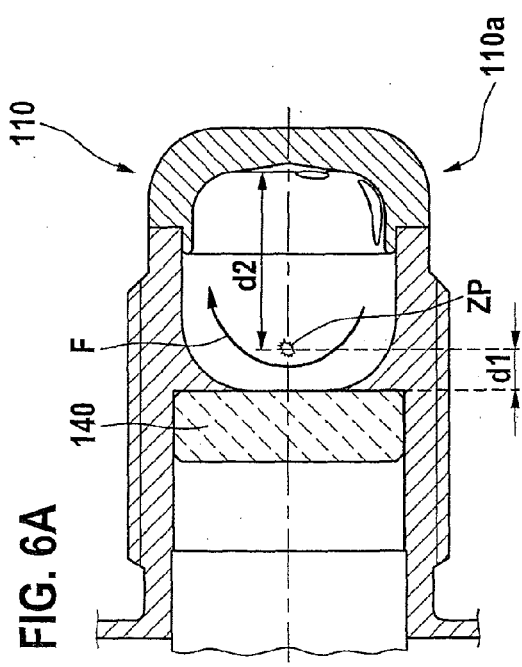
Figure 6C:
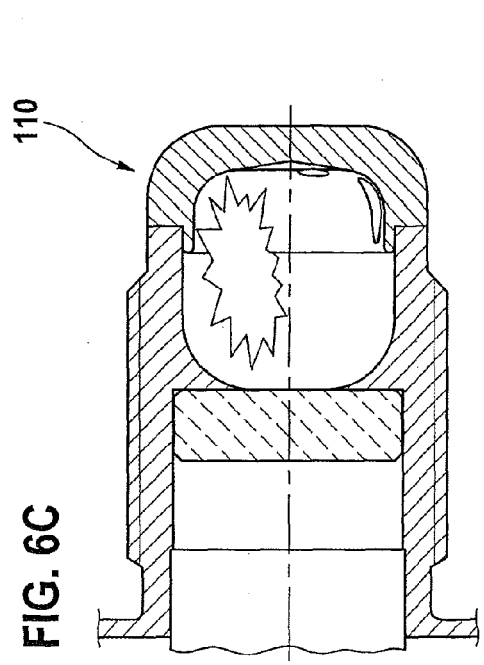

The design of laser spark plug 100 according to the present invention in such a way that laser radiation 20 is radiated onto an ignition point ZP lying in prechamber 110, the distance d1 of which from a combustion chamber window 140 is smaller than its distance d2 from an end area 110a of prechamber 110 facing the combustion chamber, advantageously causes a flame core produced in ignition point ZP to be carried along by fluid flow F according to the present invention, which in the present case results in a clockwise movement of the flame core through internal space 111 of prechamber 110, see FIGS. 6b through 6d.

After laser ignition, fluid flow F according to the present invention carries the flame core clockwise in the direction of end area 110a facing the combustion chamber (FIG. 6a) of prechamber 110, so that the flame subsequently ignites from there from the residual product of the prechamber volume. Compared to conventional prechambers without tumble flow in which a flame front burns from one combustion chamber window in the direction of end area 110a facing the combustion chamber, less unburned mixture is ejected from prechamber 110 into main combustion chamber 200 when the pressure in prechamber 110 rises due to the incipient combustion. When the principle according to the present invention is used, the prechamber volume is thus used more efficiently than in conventional laser spark plugs.

This advantageously makes it possible to design the relevant components, in particular prechamber 110, to be smaller than in conventional systems without having to accept a loss of ignition performance in return.

Due to the asymmetric positioning of overflow channels 120 in several example embodiments of the laser spark plug according to the present invention, it may be necessary to assemble laser spark plug 100 according to the present invention in a targeted manner in relation to the cylinder head of the destination system.

The provision of curved overflow channels may advantageously contribute to directing ignition flares emerging from prechamber 110 into combustion chamber 200 in a desired direction, in particular distributing them uniformly in combustion chamber 200.

What is claimed is:

1. A laser spark plug device for an internal combustion engine, comprising:
   a prechamber configured to receive an ignitable medium; and
   at least one overflow channel configured to provide a fluid connection between an internal space of the prechamber and an external space surrounding the prechamber, wherein the at least one overflow channel is configured in such a way that when a fluid flows through the overflow channel into the internal space of the prechamber a fluid flow having at least one eddy is generated in the internal space of the prechamber, the at least one eddy rotating on an eddy axis forming an angle of more than approximately 45° with a longitudinal axis of the laser spark plug device;
   wherein a plurality of overflow channels are provided, and wherein longitudinal axes of at least three overflow channels intersect at a point of intersection located in the internal space of the prechamber.

2. The laser spark plug device as recited in claim 1, wherein the point of intersection lies in a radially outer region of the internal space of the prechamber.

3. The laser spark plug device as recited in claim 1, wherein openings of the at least three overflow channels facing the external space surrounding the prechamber and having the longitudinal axes intersecting at the point of intersection in the internal space of the prechamber are at least one of (i) at a substantially uniform distance from one another and (ii) at a substantially uniform distance from the longitudinal axis of the laser spark plug device.

4. A laser spark plug device for an internal combustion engine, comprising:
   a prechamber configured to receive an ignitable medium;
   at least one overflow channel configured to provide a fluid connection between an internal space of the prechamber and an external space surrounding the prechamber, wherein the at least one overflow channel is configured in such a way that when a fluid flows through the overflow channel into the internal space of the prechamber a fluid flow having at least one eddy is generated in the internal space of the prechamber, the at least one eddy rotating on an eddy axis forming an angle of more than approximately 45° with a longitudinal axis of the laser spark plug device;
   a combustion chamber window having a surface facing the prechamber; and
   at least one flow-guiding element configured to guide the fluid flow tangentially past the surface of the combustion chamber window facing the prechamber.

5. The laser spark plug device as recited in claim 1, further comprising:
   a combustion chamber window having a surface facing the prechamber, wherein the surface facing the prechamber is flush with at least a portion of an internal wall of the prechamber.

6. The laser spark plug device as recited in claim 1, further comprising:
   a combustion chamber window having a surface facing the prechamber;
   wherein the laser spark plug device is configured to radiate laser radiation onto an ignition point lying in the prechamber, and wherein a distance of the ignition point from the combustion chamber window is at least approximately 50% less than a distance of the ignition point from an end area of the prechamber facing a combustion chamber.

* * * * *